United States Patent [19]

Nater

[11] Patent Number: 4,474,342

[45] Date of Patent: Oct. 2, 1984

[54] MAGNETIC TAPE CARTRIDGE WITH SPRING BIASED ROLLER

[75] Inventor: Charles Nater, Saratoga, Calif.

[73] Assignee: Fuji Photo Film Co., Ltd., Kanagawa, Japan

[21] Appl. No.: 342,962

[22] Filed: Jan. 26, 1982

[51] Int. Cl.³ .................. B65H 17/14; G11B 15/26; G11B 23/04

[52] U.S. Cl. .................. 242/192; 226/170; 242/76; 242/199; 360/132

[58] Field of Search ............ 242/192, 197, 198, 199, 242/200, 76; 226/198, 170; 360/96.1, 96.3, 132

[56] References Cited

U.S. PATENT DOCUMENTS

| | | | |
|---|---|---|---|
| 3,197,151 | 7/1965 | Sparks et al. | 242/198 |
| 3,222,003 | 12/1965 | Guerth | 242/192 |
| 3,519,218 | 7/1970 | Mees | 242/192 X |
| 3,642,225 | 2/1972 | Kakichi et al. | 242/199 X |
| 3,758,048 | 9/1973 | Sugaya et al. | 242/192 |
| 3,942,743 | 3/1976 | Jinsenji | 242/192 |
| 3,974,982 | 8/1976 | Stone | 242/198 X |
| 4,242,709 | 12/1980 | Stricker | 242/192 X |

Primary Examiner—Harvey C. Hornsby
Assistant Examiner—Scott J. Haugland
Attorney, Agent, or Firm—Sughrue, Mion, Zinn, Macpeak & Seas

[57] ABSTRACT

A tape cartridge has a roller driven continuous belt which supports a wide thin tape when transported in the vicinity of video recording machine heads. A spring biased movable belt idler applies a predetermined amount of tension to the belt thus keeping the tension in the belt constant regardless of changes in temperature, humidity, etc. Since the belt both supports and supplies constant tension to the tape, tape bounce, tape breakage, tape stretch and tape wear are minimized and the manufacturing tolerances of the belt are significantly improved.

14 Claims, 8 Drawing Figures

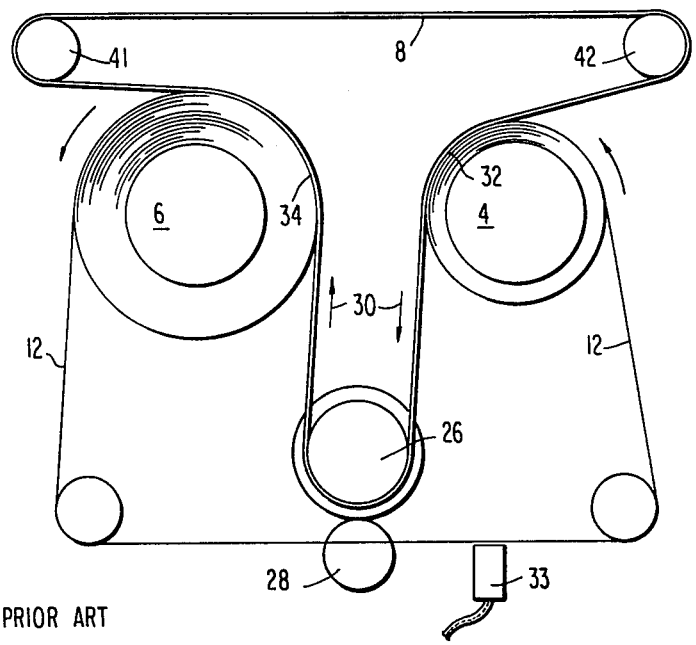
FIG.1 PRIOR ART
FIG.2 PRIOR ART
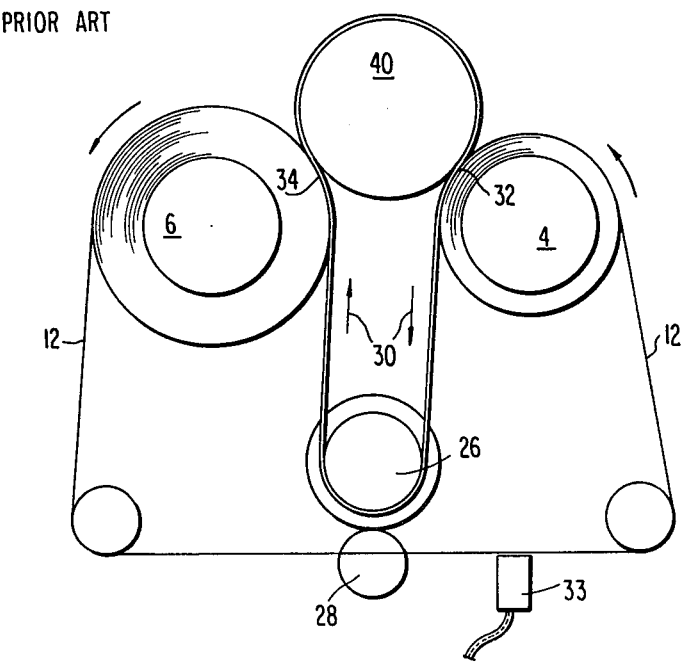

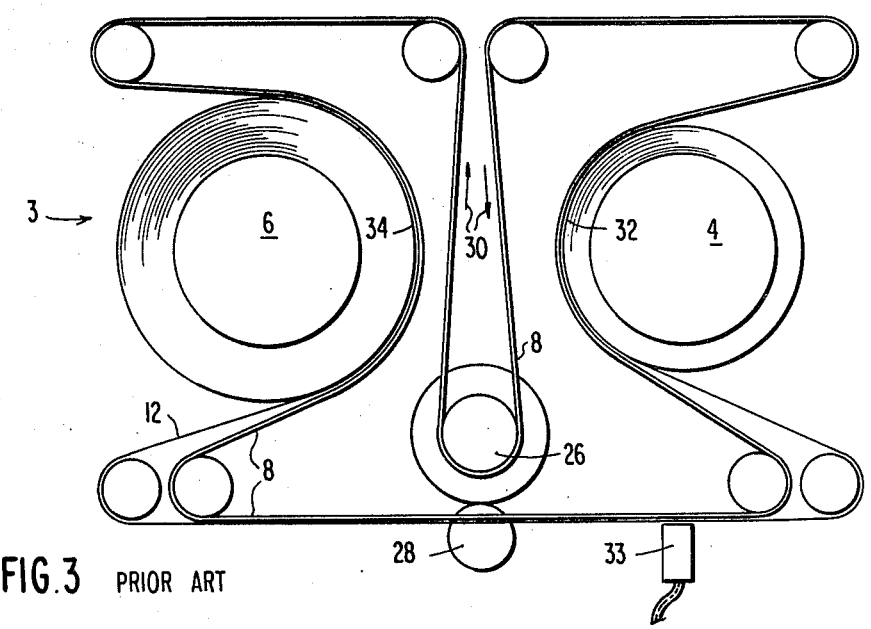
FIG.3 PRIOR ART
FIG.4
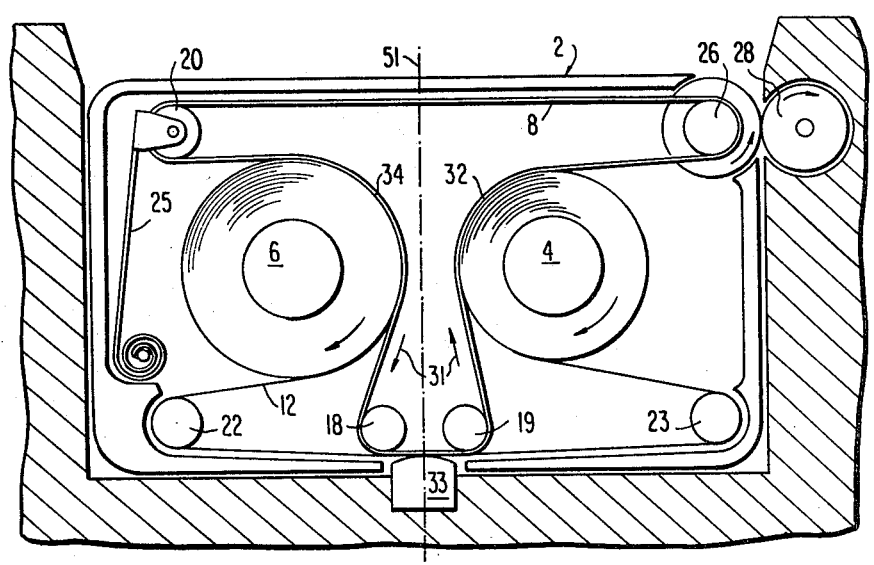

MAGNETIC TAPE CARTRIDGE WITH SPRING BIASED ROLLER

BACKGROUND OF THE INVENTION

1. Field of the Invention

The present invention relates to a magnetic tape cartridge or cassette having a rigid or resilient belt driving means. A magnetic tape cartridge is commonly referred to as a "cassette" and these terms as used herein are intended to mean the same thing.

2. Description of the Prior Art

Typical tape cartridges utilize tape which is 0.156 inches wide. Such tape is capable of storing only a limited amount of information. Recent tape recorders have been developed which require a tape cartridge which is capable of storing a much larger amount of information, as much as 120,000 bits per inch. To store this amount of information, it has been proposed to use tape as wide as a quarter of an inch.

Recent video cassette recorders also require that the tape be transported at a relatively fast rate so that the desired amount of information can be adequately recorded and played back. Typical digital recording tape is generally 60 feet long and provides 15 minutes of playing time. However, recent video recorders require as much as 300 feet of tape in order to provide 20 minutes of playing time. If such a long tape is to be used in a small cartridge, the tape must be extremely thin so that the size of the supply and take-up reels can be kept reasonably small.

Problems have been encountered in constructing a cartridge capable of transporting such a wide and thin tape. The tape tends to bounce in the vertical direction as it is transported past the machine heads. Tape bounce causes errors in recording and reading the tape especially when high recording densities are being used. There have been attempts in prior art cartridges to minimize tape bounce by utilizing a resilient belt which turns the periphery of the take-up reel at a faster rate than the periphery of the tape supply reel is turned, thereby applying tension to the tape. FIGS. 1 and 2 show two such prior art cartridges.

In FIG. 1, a resilient belt 8 is driven in the direction of arrows 30 by a roller 26 which is driven by a recording machine drive wheel 28. The belt 8 passes around a periphery 34 of a supply reel 6, around idlers 41 and 42, and around a periphery 32 of a take-up reel 4. The belt 8 is caused to stretch by the force applied by the roller 26, and the belt 8 stretches more in the vicinity of the periphery 32 of the take-up reel 4 than in the vicinity of the periphery 34 of the supply reel 6 since the tension of the belt continuously diminishes along its length. The tension is at minimum in a section of the belt located immediately to the left of the roller 26. Therefore, since the belt 8 stretches more in the vicinity of the periphery 32 than in the vicinity of the periphery 34, the periphery of the take-up reel tries to turn faster than the periphery of the supply reel thereby applying tension to the tape 12 as it is transported past the machine heads 33. The prior art cartridge shown in FIG. 2 is similar to that shown in FIG. 1 except that a floating idler 40 is used to guide the belt instead of the fixed dual idlers 41 and 42 shown in FIG. 1.

The prior art cartridges have been found to be inadequate when a wide thin tape is utilized. Specifically, the tension supplied to the tape is insufficient to reduce the tape bounce to the degree required when very high recording densities are applied to the tape.

An improved tape cartridge as shown in FIG. 3 has been proposed and is disclosed and claimed in commonly assigned U.S. patent application Ser. No. 307,147, filed Sept. 30, 1981. The cartridge 3 has a resilient belt 8 which supports the tape 12 in the vicinity of the machine heads 33 in addition to turning the periphery of the take-up reel 4 and the supply reel 6. Again, as in the cartridges shown in FIGS. 1 and 2, the periphery 32 of the take-up reel 4 tries to turn faster than the periphery 34 of the supply reel 6 thereby applying tension to the tape as it is transported past the machine heads.

A feature common to each of the cartridges shown in FIGS. 1-3 is that the resilient belt 8 applies a non-uniform tension to the tape 12 since the resilient belt is temperature and humidity sensitive. Changes in belt tension caused by changes in temperature and/or humidity adversely affect the tension in the tape 12 as it is being transported, thereby resulting in undesirable tape bounce. Changes in the tension applied to the tape 12 also contribute to tape breakage, tape stretch and tape wear.

SUMMARY OF THE INVENTION

It is therefore an object of the present invention to provide a cartridge which is capable of applying a constant tension to a belt which supports a tape as the tape is transported from the tape supply reel to the tape take-up reel.

It is a further object of the present invention to provide a cartridge capable of transporting a wide and thin tape so that the bouncing of the tape is minimized in the vicinity of the machine heads.

A yet further object is to provide a cartridge having belt and tape paths which permit the maximum size of the supply and take-up reels to overlap.

Specifically, in accordance with the present invention, a cartridge for transporting a wide thin tape has a rigid or resilient belt driven by a roller and guided by a plurality of belt idlers. The belt turns the periphery of the take-up reel and the periphery of the supply reel. In addition, the belt is used to support the tape in the vicinity of the machine heads thereby minimizing tape bounce. One of the belt idlers is movable and is biased by a spring thereby maintaining constant tension in the belt.

BRIEF DESCRIPTION OF THE DRAWINGS

FIG. 1 shows a prior art cartridge utilizing a resilient belt for turning the tape supply and take-up reels;

FIG. 2 shows a prior art cartridge similar to that shown in FIG. 1 except that a floating roller guides the belt rather than dual idlers;

FIG. 3 shows a prior art cartridge having a resilient belt which transports and supports the tape;

FIG. 4 shows a cartridge constructed in accordance with the present invention, the cartridge having a spring biased movable belt idler for maintaining constant tension in the belt;

DESCRIPTION OF THE PREFERRED EMBODIMENTS

Figure 5:
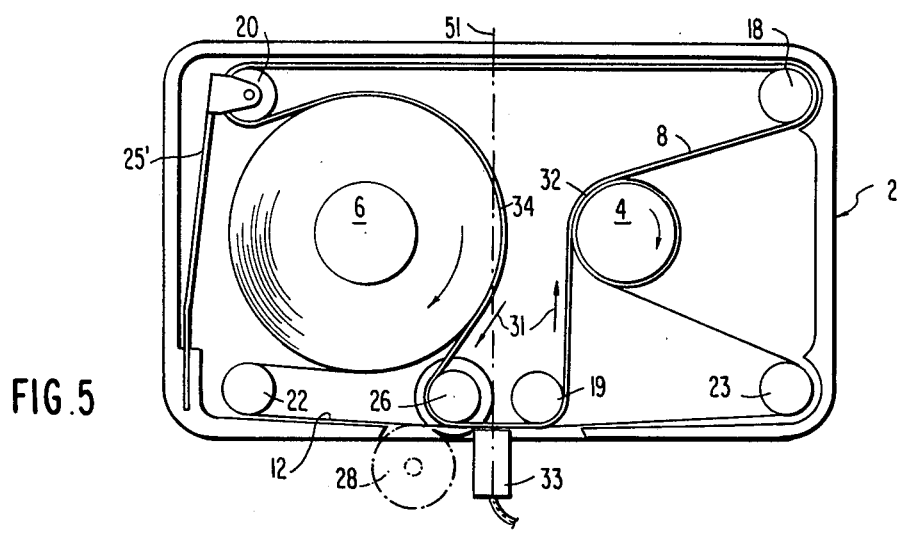
FIG. 5 shows a cartridge constructed in accordance with the present invention wherein an alternative positioning of the drive roller is shown.

Referring to FIG. 4, a tape cartridge 2 has a tape take-up reel 4 and a tape supply reel 6 for taking up and supplying a recording tape 12, shown as a solid thin line. An endless belt 8 is wrapped around a series of belt idlers 18, 19 and 20 as well as a drive roller 26. The drive roller 26 is adapted to be driven by a drive wheel 28 of a recording machine in a manner commonly known in the art. The roller 26 transports the belt 8 in the direction of arrows 31 when the tape 12 is transported in the forward direction. The roller 26 and the drive wheel 28 can also be made capable of driving the belt 8 in the direction opposite that of arrows 31 in which case reel 6 becomes the take-up reel and reel 4 the supply reel.

As FIG. 4 indicates, the roller 26 and the belt idler 19 are offset with respect to a periphery 32 of the take-up reel 4 facing the center of the cartridge 2. In addition, the belt idlers 18 and 20 are offset with respect to a periphery 34 of the supply reel 6 facing the center of the cartridge 2. The belt 8 therefore passes around the periphery 32, 34 of the take-up and supply reels 4, 6 as the belt 8 is driven by the roller 26 and the drive wheel 28 thereby driving these reels. As the belt 8 drives the reels 4, 6, the tape 12 wound onto the supply reel 6 is transported to the take-up reel 4 and wound onto this latter reel.

In the preferred embodiment, the belt 8 is made of a material which is slightly resilient. Therefore, as the belt 8 is pulled and transported by the roller 26, the belt 8 stretches more in the vicinity of the periphery 32 of the take-up reel 4 than in the vicinity of the periphery 34 of the supply reel 6 so that the periphery of the take-up reel 4 tries to turn faster than the periphery of the supply reel 6 which applies tension to the tape as it is transported past the machine heads 33. In addition, as the tape 12 passes around the periphery 32 of the take-up reel 4 slippage between the belt 8 and the tape 12 is less than the slippage between the belt 8 and the tape 12 as the tape passes around the periphery 34 of the supply reel 6. This difference in slippage also results in the periphery 32 of the take-up reel trying to turn faster than the periphery 34 of the supply reel.

The belt 8 is required to be strong and have a certain amount of resilience. Polyurethane satisfies both these criteria. In addition, polyurethane also has a relatively high coefficient of friction which is desirable since the belt 8 must support and transport the tape 12 and turn the supply and take-up reels. Other resilient materials also can be used for the belt 8, e.g., polyethylene, neoprene or rubber.

The tape 12 passes around the tape idlers 22 and 23 as the tape 12 is transported from the supply reel 6 to the take-up reel 4. As the tape 12 is transported from the tape idler 22 to the tape idler 23, it passes the read/write and erase machine heads 33. As the tape 12 is transported in the vicinity of the heads 33, the tape 12 is in contact with and supported by the belt 8 thereby minimizing vertical tape bounce in the vicinity of the heads 33. The support provided by the belt 8 permits the use of an extremely thin tape 12. Preferably, the tape idlers 22 and 23 are disposed slightly above the belt idlers 18 and 19 as shown in FIG. 4 resulting in sufficient contact between the tape 12 and the belt 8 in the vicinity of the heads to insure that the tape 12 is adequately supported by the belt 8.

One of the essential features of the present invention is that the belt idler 20 is movable and is supported by a spring 25 which biases the movable idler 20 to the left in FIGS. 4 and 5 thereby applying a constant amount of tension to the belt 8 regardless of variations in temperature and humidity. An optimum level of tension in the belt 8 is required if the belt 8 is to properly turn the take-up and supply reels 4, 6 and transport and support the tape 12 as described above.

Using the spring biased movable belt idler 20 insures that the belt 8 maintains the desired optimum level of tension even though the belt 8 expands and contracts due to changes in temperature and humidity. In addition, using the spring biased movable belt idler 20 greatly relaxes the fabrication tolerances that are required when manufacturing the belt 8 thereby reducing manufacturing costs. Without the spring biased movable belt idler 20, the thickness of the belt 8 and its length must be strictly controlled to produce a belt 8 which will maintain a desired amount of tension under varying operating conditions where temperature and humidity are not maintained constant. In addition, the relaxed manufacturing tolerances which exist when the spring biased movable belt idler 20 is used increases the number of materials which can suitable be used in manufacturing the belt 8.

Since the belt 8 is under tension as it transports and supports the tape 12 in the vicinity of the machine heads 33, vertical tape bounce is minimized which reduces errors in recording and reading the tape 12 especially when high recording densities are being used. In addition, since the tension in the belt 8 is maintained constant by the spring biased movable belt idler 20, the differences between the speeds at which the periphery of the take-up reel 4 and the supply reel 6 are driven is maintained constant. Therefore, the tension applied to the tape by this speed differential is also maintained constant which minimizes tape breakage, tape stretch and tape wear.

Without the support provided by the belt 8, the tape 12 is required to be relatively thick in order to possess enough stiffness to prevent excessive vertical tape bounce. The use of a relatively thick tape 12 requires either that the supply and take-up reels be extraordinarily large for a cartridge or that the tape 12 be relatively short and provide a small amount of continuous playing and recording time.

Figure 7:
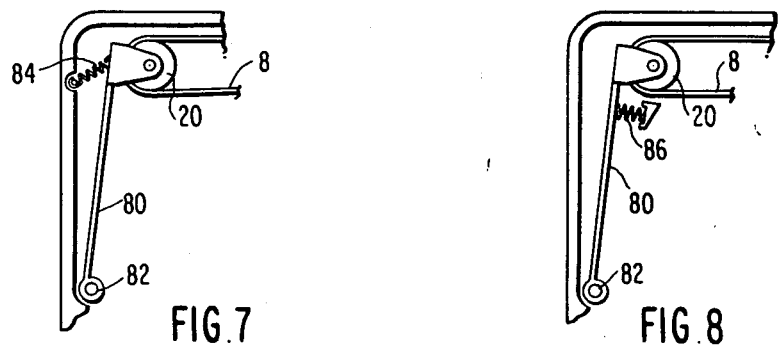
FIGS. 7 and 8 show alternative belt tensioning means.
Figure 8:
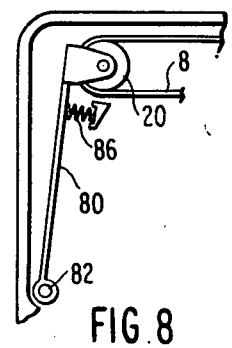

Various kinds of springs, other than the clock spring 25 shown in FIG. 4, can be used to appropriately bias the movable belt idler 20. One alternative is to use a leaf spring 25' which is shown in FIG. 5. Other alternatives are shown in FIGS. 7 and 8. In FIG. 7 the movable idler 20 is supported on arm 80 which can pivot about pin 82. The arm 80 is biased by a tension spring 84. Alternatively, a compression spring 86 can be used to bias the arm 80 as shown in FIG. 8. As can readily be seen, various other kinds of springs can also be used to bias the movable belt idler 20 in order to provide the desired constant amount of tension to the belt 8.

Though it is desirable to use a belt 8 which is resilient so that the take-up reel 4 tries to turn faster than the supply reel 6, a rigid belt 8 can alternatively be employed in the cartridge shown in FIG. 4.

In the event a rigid belt 8 is employed rather than a resilient belt, a yet further embodiment of the invention shown in FIG. 5 can be utilized. In this embodiment, the drive roller 26 is positioned close to a vertical center line of the cartridge rather than above and to the side of the take-up reel as shown in FIG. 4. In the embodiment shown in FIG. 5, maximum tension to the belt is applied as the belt passes around the supply reel whereas in the embodiment shown in FIG. 4, maximum tension is applied to the belt as it passes around the take-up reel. However, in the embodiment of FIG. 5, the periphery 32 of the take-up reel tries to turn at the same speed as the periphery 34 of the supply reel since the belt 8 does not stretch. Since the tape 12 is supported by the belt 8 as the tape 12 is transported past the machine heads 33, vertical tape bounce is again minimized so that high recording densities can be used. The cartridge shown in FIG. 5 gives one the advantage of having a choice as to where to locate the drive wheel 28 in the recording device to be used with the cartridge built in accordance with the present invention. In the embodiment of FIG. 4, the placement of the drive wheel 28 allows the height of the recording device along a center vertical line 51 to be kept to a minimum while in the embodiment of FIG. 5 the length of the recording device along a direction perpendicular to the line 51 can be kept to a minimum.

It should also be noted that, in the cartridge shwon in FIG. 5, the drive roller 26 is capable of driving the tape in both a forward and a reverse direction. Alternatively, the belt idler 19 can be replaced with a second drive roller in which case the tape 12 could be transported in a reverse direction by simply flipping the cartridge over. Of course, the first and second drive rollers 26, 19 would have to be symmetrically positioned about the vertical center line 51 of the cartridge for the cartridge to be properly driven by the drive wheel 28 when the cartridge is flipped over.

A further feature of the present invention is that the roller 26 and the belt idlers in FIGS. 4 and 5 are arranged so that the belt path does not permanently disect the interior of the cartridge and therefor unduly limit the maximum amount of tape which can be wound on either the tape take-up or supply reel 4, 6. In the preferred embodiments of the present invention, the roller 26 and the belt idler 19 in FIG. 5, and alternatively the belt idlers 18, 19 in FIG. 4, are located very close to the vertical center line 51 of the cartridge 2 at the bottom thereof. This arrangement minimizes any interference between the belt idlers 18, 19 and the supply and take-up reel 6, 4 (FIG. 4) which maximizes the amount of tape which can be wound on these reels.

Figure 6:
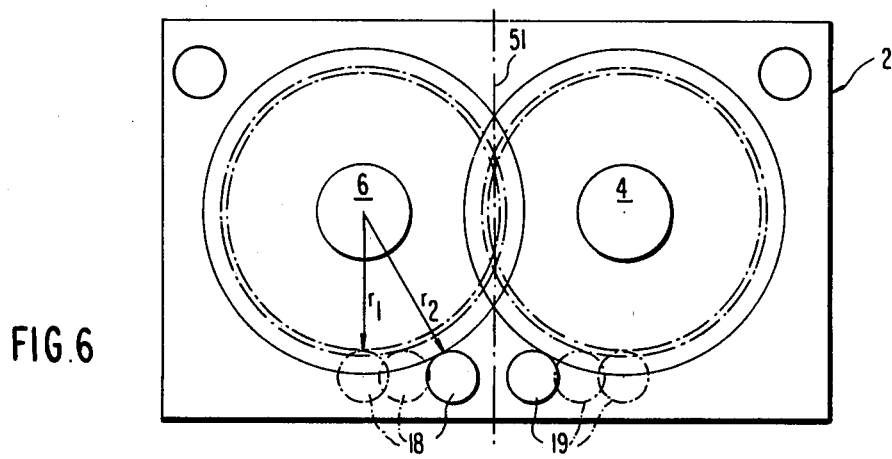
FIG. 6 shows several possible positions of the belt idlers of the cartridge of FIG. 5.

As FIG. 6 readily indicates as the belt idlers 18, 19 are displaced further way from the vertical center line 51 of the cartridge 2, the maximum amount of tape which can be built onto the supply reel 6 decreases. In addition, the maximum radius of the tape decreases from $r_2$ to $r_1$ when the belt idlers 18, 19 are moved away from the vertical center line 51 and positioned directly beneath the supply and take-up reels respectively. In the preferred arrangement where the belt idlers 18, 19 are arranged very close to the vertical center line 51 of the cartridge 2, the maximum amount of tape which can be built onto the supply reel 6 increases which results in the supply reel 6 having a radius $r_2$ which extends beyond the vertical center line 51 of the cartridge 2. In addition, the path of the belt 8 is such that the belt 8 does not inhibit the maximum amount of tape which can be built onto the supply and take-up reels 6, 4. Since the take-up reel 4 has little or no tape wound thereon and therefor a minimum radius when all of the tape is wound onto the supply reel 6, no interference results between the reels even though the amount of tape in the cartridge causes the diameter of the reels to extend beyond the center line 51 of the cartridge at the beginning of play and at the end of play of the tape 12. Such reel overlapping therefore increases the tape capacity of the cartridge 2.

Finally, the cartridge of the present invention utilizes separate tape idlers 22, 23 for guiding the tape 12 to and from the take-up reel 4 and the supply reel 6, which, as fully explained in the above-mentioned U.S. patent application Ser. No. 307,147, allows a smooth take-up reel to be built as the tape 12 is transported and wound onto the take-up reel 4.

I claim:

1. A tape cartridge having a take-up reel and a supply reel for taking up and supplying a tape for use in a recording machine having heads, comprising:
   a continuous belt, said belt supporting said tape in a vicinity of said machine heads; means for driving said belt so that said belt contacts a periphery of said take-up reel and said supply reel causing said reels to turn, said driving means including a drive roller adapted to be driven by said machine, said drive roller being located close to a top edge of a side edge of said cartridge, said top edge being opposite a bottom edge of said cartridge which confronts said machine heads; and
   idler means for guiding said belt and tape, said idler means including a movable belt idler and spring means for biasing said movable belt idler to apply a constant tension to said belt, said movable belt idler being positioned close to a second side edge of said top edge of said cartridge wherein said drive roller is capable of driving said belt in either a first direction or a second direction;
   said idler means further including first and second belt idlers disposed near said bottom edge of said cartridge which confronts said machine heads so as to be symmetrically disposed on opposite sides and close to a vertical center line of said cartridge;
   said idler means also including first and second tape idlers located close to said side edges of said cartridge, wherein said first and second belt idlers are disposed closer to said bottom edge of said cartridge than said first and second tape idlers so that said tape is securely supported by said belt in the vicinity of said heads.

2. The cartridge claimed in claim 1 wherein said spring means comprises a leaf spring.

3. The cartridge claimed in claim 1 wherein said spring means comprises a clock spring.

4. The cartridge claimed in claim 1 wherein said spring means comprises a tension spring.

5. The cartridge claimed in claim 1 wherein said spring means comprises a compression spring.

6. The cartridge claimed in claim 1 wherein said belt is made of a resilient material.

7. The cartridge claimed in claim 1 wherein said resilient material is polyurethane.

8. The cartridge claimed in claim 6 wherein said drive roller applies additional tension to said belt causing said belt to stretch more in the vicinity of said periphery of said take-up reel than in the vicintiy of said periphery of said supply reel.

9. A tape cartridge having a take-up reel and a supply reel for taking-up and supplying a tape for use in a recording machine having heads, comprising:
   a continuous belt, said belt supporting said tape in a vicinity of said machine heads;

means for driving said belt so that said belt contacts a periphery of said take-up reel and said supply reel causing said reels to turn, said driving means including a drive roller adapted to be driven by said machine, said drive roller being located close to a vertical center line of said cartridge and close to a bottom edge of said cartridge which confronts said machine heads, wherein said drive roller is capable of driving said belt in either a first direction or a second direction; and idler means for guiding said belt and tape, said idler means including a movable belt idler and a spring means for biasing said movable belt idler to apply a constant tension to said belt, said idler means including a second roller, said drive roller and said second roller being symmetrically disposed on opposite sides of and close to said vertical center line;

said idler means further including a fixed belt idler positioned above said take-up reel and close to a side edge of said cartridge closest to said take-up reel, said movable belt idler being positioned above said supply reel and close to another side edge of said cartridge closest to said supply reel so that said belt passes around said movable belt idler, contacts said periphery of said supply reel, passes around said drive roller and said second roller, contacts said periphery of said take-up reel, and passes around said fixed belt idler;

said idler means also including first and second tape idlers located close to said side edges of said cartridge for guiding said tape away from said supply reel past said heads and towards said take-up reel, said tape being supported by said belt as said tape is guided past said heads, and wherein said drive roller and said second roller are disposed closer to said bottom edge of said cartridge than said first and second tape idlers so that said tape is securely supported by said belt in the vicinity of said heads.

10. The cartridge claimed in claim 9 wherein said belt is made of a rigid material.

11. The cartridge claimed in claim 9 wherein said spring means comprises a leaf spring.

12. The cartridge claimed in claim 9 wherein said spring means comprises a clock spring.

13. The cartridge claimed in claim 9 wherein said spring means comprises a tension spring.

14. The cartridge claimed in claim 9 wherein said spring means comprises a compression spring.

* * * * *